United States Patent
Liu

(10) Patent No.: US 8,107,034 B2
(45) Date of Patent: Jan. 31, 2012

(54) BACKLIGHT MODULE WITH LIGHT CONCENTRATING AND SCATTERING STRUCTURE AND LIQUID CRYSTAL DISPLAY USING SAME

(75) Inventor: Chin-Yuan Liu, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 390 days.

(21) Appl. No.: 12/384,415

(22) Filed: Apr. 3, 2009

(65) Prior Publication Data
US 2009/0251633 A1 Oct. 8, 2009

(30) Foreign Application Priority Data
Apr. 3, 2008 (TW) ................................ 97112280 A

(51) Int. Cl.
*G02F 1/1335* (2006.01)
*G09F 13/04* (2006.01)
(52) U.S. Cl. .............. 349/61; 349/62; 349/65; 362/97.3
(58) Field of Classification Search ............... 349/61, 349/62, 65; 362/97.3
See application file for complete search history.

(56) References Cited

U.S. PATENT DOCUMENTS

| | | | |
|---|---|---|---|
| 5,594,830 A | 1/1997 | Winston et al. | |
| 7,217,025 B2 * | 5/2007 | Kim et al. | 362/610 |
| 7,287,896 B2 * | 10/2007 | Okamoto et al. | 362/634 |
| 2006/0164858 A1 | 7/2006 | Park et al. | |

FOREIGN PATENT DOCUMENTS

| | | |
|---|---|---|
| CN | 2607593 Y | 3/2004 |
| CN | 1499264 A | 5/2004 |
| CN | 1680851 A | 10/2005 |

* cited by examiner

*Primary Examiner* — Mike Qi
(74) *Attorney, Agent, or Firm* — Altis Law Group, Inc.

(57) ABSTRACT

A backlight module (20) includes a light guide plate (200) and a light source (210). The light guide plate includes a light incident surface (202). The light source includes light emitting diodes (LEDs) (211) and a light concentrating and scattering structure (214). The light concentrating and scattering structure is disposed between the LEDs and the light incident surface and is away from the light incident surface by a predetermined distance, light emitting from the LEDs is focused and then scattered into the light incident surface.

20 Claims, 3 Drawing Sheets

US 8,107,034 B2

BACKLIGHT MODULE WITH LIGHT CONCENTRATING AND SCATTERING STRUCTURE AND LIQUID CRYSTAL DISPLAY USING SAME

BACKGROUND

1. Technical Field

The present disclosure relates to backlight modules and liquid crystal displays (LCDs), and particularly to a backlight module having a light concentrating and scattering structure and an LCD using the same.

2. Description of Related Art

Liquid crystal devices (LCDs) are commonly used as displays for compact electronic apparatuses. This is because LCDs not only provide good quality images using little power, but are also conveniently thin. Because liquid crystal in an LCD does not emit any light itself, the LCD requires a light source to clearly and sharply display text and images. Therefore, LCDs typically require a backlight module.

Referring to FIG. 8, a typical backlight module 10 includes a light guide plate 100 and two light emitting diodes (LEDs) 110. The light guide plate 100 includes a light emitting surface 104 and a light incident surface 102 perpendicular to the light emitting surface 104. The LEDs 110 are disposed adjacent to the light incident surface 102. The light guide plate 100 transforms the point light emitting from the LEDs 110 into a surface light.

However, light beams emitting from each LED 110 have a limited divergence angle ψ. Thus, a darkened area 108 is formed in the light guide plate 100 in a region corresponding to the midpoint between the two LEDs 110. Therefore, the backlight module 10 cannot produce uniform brightness over the whole light emitting surface 104.

What is needed, therefore, is a backlight module that can overcome the above-described deficiencies. What is also needed is an LCD using the backlight module.

DETAILED DESCRIPTION

Reference will now be made to the drawings to describe various embodiments of the present disclosure in detail.

Figure 1:
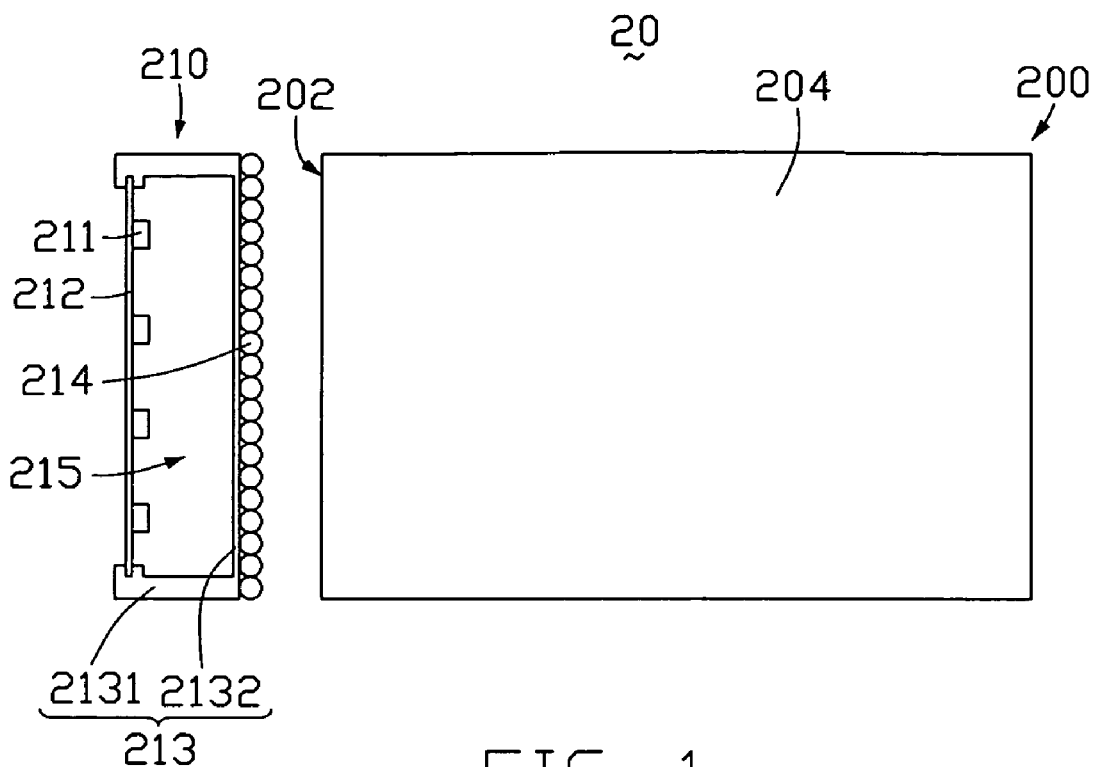
FIG. 1 is a plan view of a backlight module according to a first embodiment of the present disclosure, the backlight module including a light source, the light source including a plurality of light emitting diodes (LEDs).

FIG. 1 is a plan view of a backlight module according to a first embodiment of the present disclosure. The backlight module 20 includes a light guide plate 200 and a light source 210. The light guide plate 200 includes a light emitting surface 204, and a light incident surface 202 perpendicular to the light emitting surface 204.

Figure 2:
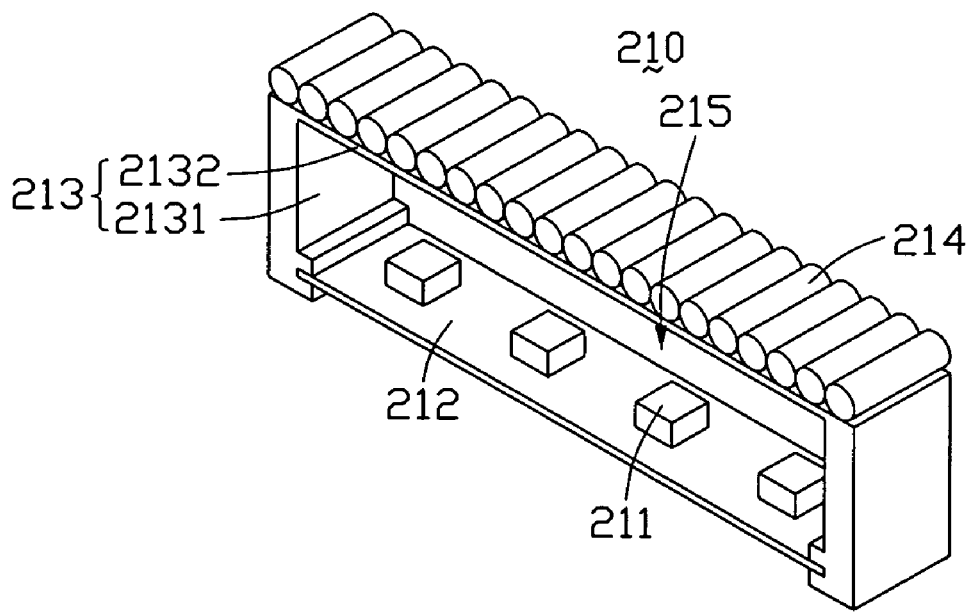
FIG. 2 is an isometric view of the light source of FIG. 1.

Referring to FIG. 2, the light source 210 includes a plurality of light emitting diodes (LEDs) 211, a printed circuit board 212, a supporting member 213, and a light concentrating and scattering structure 214. The supporting member 213 includes a strip-shaped supporting board 2132, and two supporting arms 2131 extending perpendicularly from two opposite ends of the supporting board 2132. The supporting board 2132 is made from transparent material having high transparency. An inner surface of each supporting arm 2131 is coated with a reflective film. The printed circuit board 212 has a rectangular shape. The two supporting arms 2131 engage with the printed circuit board 212, thereby forming an accommodating room 215. The plurality of LEDs 211 are disposed on an inner surface of the printed circuit board 212 adjacent to the accommodating room 215.

The light concentrating and scattering structure 214 is disposed on an outer surface of the supporting board 2132. The light concentrating and scattering structure 214 includes a plurality of cylinders (not labeled) functioning as convex lenses. The cylinders are arranged closely one by one along a longitudinal direction of the supporting board 2132. A longitudinal axis of each cylinder is perpendicular to the light emitting surface 204. In the illustrated embodiment, the cylinders are arranged in a line and touch each other. The light concentrating and scattering structure 214 is made from transparent material with high transparency.

Figure 3:
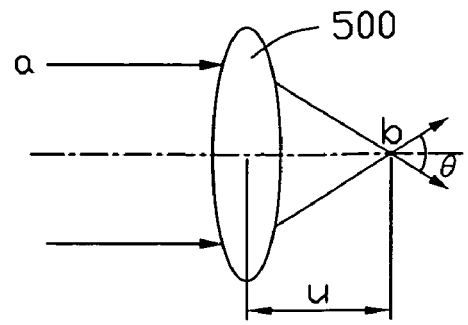
FIG. 3 is a plan view illustrating a principle of light transmitting through a lens.

Referring to FIG. 3, this illustrates paths of light passing though a convex lens 500. An operation principle of the light source 210 is as follows. Supposed that a focus b of the convex lens 500 is away from an optical centre thereof by a distance u, i.e., u is a focal length of the convex lens 500. When two light beams pass though the convex lens 500 in parallel, they focus at the point b, and have a divergence angle θ thereafter. If the focal length u decreases, the divergence angle θ increases consequently. Thus the cylinder has a minimum focal length, and accordingly a maximum divergence angle θ can be obtained.

Figure 4:
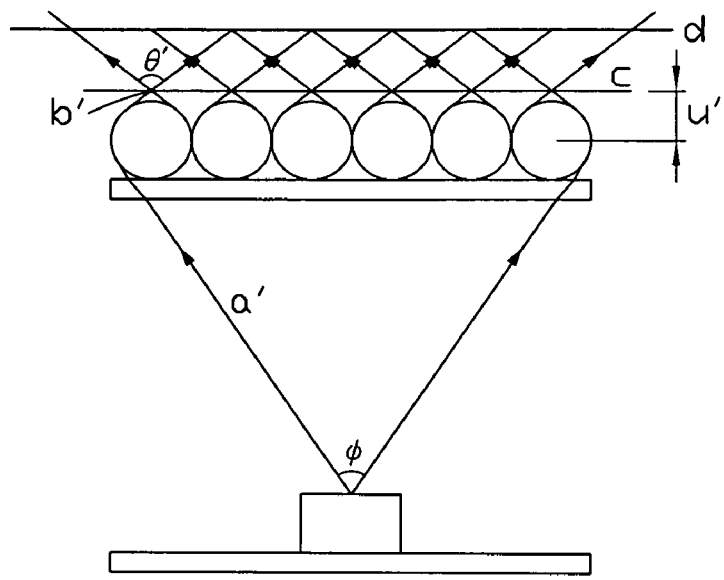
FIG. 4 is an enlarged view of part of the light source of FIG. 1, showing essential optical paths.

Referring to FIG. 4, this illustrates optical paths of an LED 211 of the light source 210. Each cylinder has a same focal length u'. Thus, in the case of two light beams emitted by the LED 211 toward each cylinder, respectively, all focuses b' of the plurality of cylinders are located on a first straight line c. The LED 211 may be considered to emit a plurality of light beams a' radiating out from a single point at the front of the LED 211, with the light beams being coplanar and having a divergence angle ψ. When the LED 211 is far away from the cylinders, a portion of the light beams a' reaching each cylinder can be considered as being parallel. The light beams a' pass through the cylinders, and focus at the focuses b' located on the first straight line c. Then the light beams exiting each cylinder are scattered with a divergence angle θ'. The divergence angle θ' is greater than the primary divergence angle ψ. The exiting light beams are focused and thereafter are mixed again, thereby forming linear light at a second straight line d.

Figure 5:
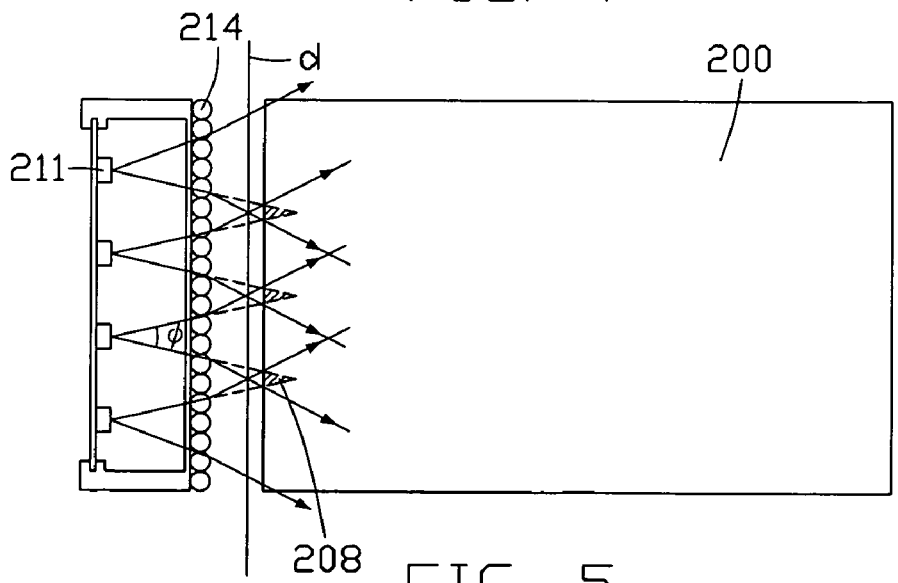
FIG. 5 is similar to FIG. 1, but also showing essential optical paths.

Referring also to FIG. 5, as described above, each LED 211 emits light beams with the divergence angle ψ. After passing through the light concentrating and scattering structure 214, the light beams are transformed into linear light at the second straight line d. The light incident surface 202 of the light guide plate 200 is disposed adjacent to the second straight line d. A distance between the light incident surface 202 and the cylinders exceeds at least the focal length u' of the cylinders. Because the light beams are scattered, they are mixed completely before entering the light incident surface 202. In one embodiment, the mixed light is incident on substantially an entirety of the light incident surface 202. In a further embodiment, the light incident on substantially the entirety of the light incident surface is substantially uniform over the entirety of the light incident surface 202. Thus, darkened areas 208 can be reduced or even avoided altogether. Accordingly, the backlight module 20 has enhanced performance with high uniformity of brightness. Furthermore, the scattering or spreading effect produced by the light concentrating and scattering structure 214 enables the light source 210 to be positioned closer to the light incident surface 202 while still reducing or even avoiding darkened areas 208. Accordingly, the backlight module 20 can be made more compact.

Figure 6:
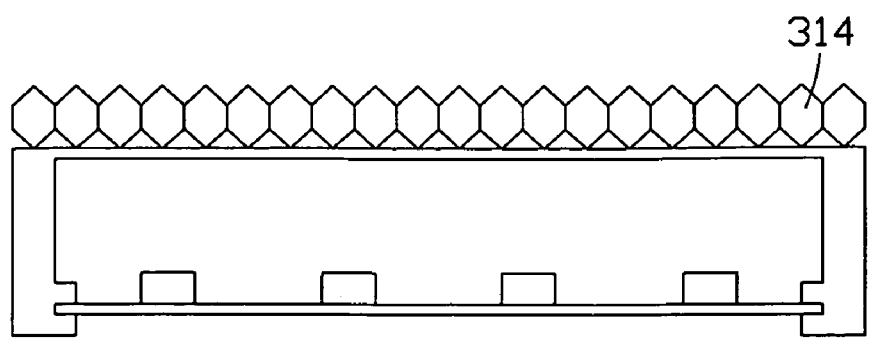
FIG. 6 is a cross-sectional view of a light source of a backlight module according to a second embodiment of the present disclosure.

Referring to FIG. 6, a light source of a backlight module according to a second embodiment of the present disclosure is similar to the light source 210. However, a light concentrating and scattering structure 314 includes a plurality of hexagonal prisms arranged closely one by one along a longitudinal direction of a supporting board. The hexagonal prisms function as lenses. The backlight module has advantages similar to those of the backlight module 20.

Figure 7:
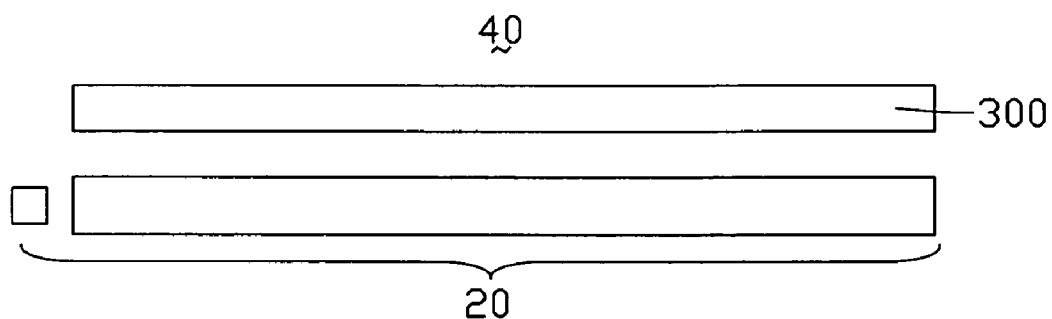
FIG. 7 is a cross-sectional view of a liquid crystal display of the present disclosure.
Figure 8:
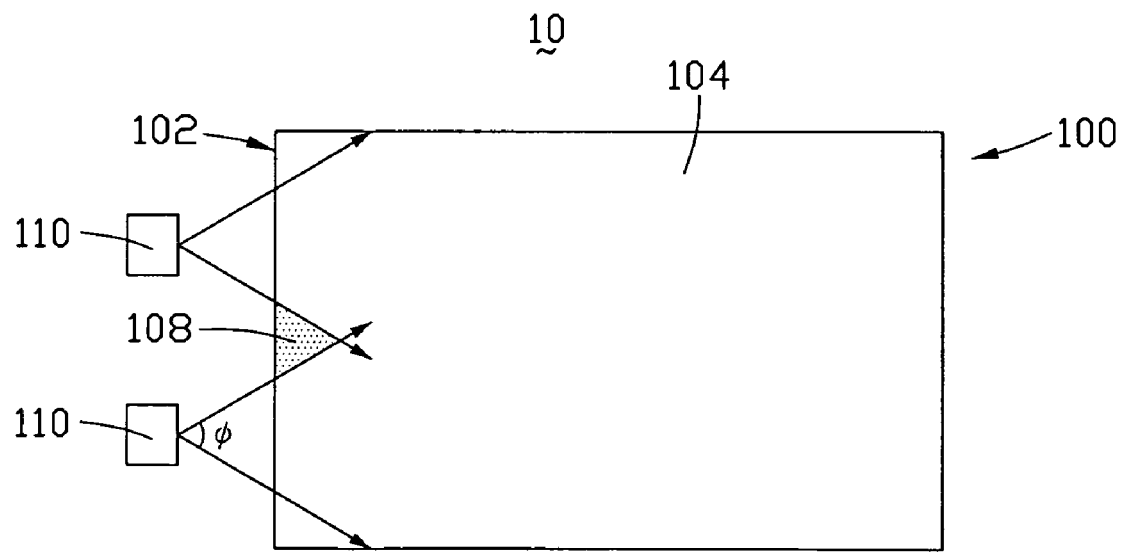
FIG. 8 is a plan view of a conventional backlight module.

Referring to FIG. 7, a liquid crystal display 40 includes a liquid crystal panel 300, and the above described backlight module 20 for providing backlight to the liquid crystal panel 300. The liquid crystal panel 300 is disposed opposite to the backlight module 20. In an alternative embodiment, the liquid crystal panel 300 may be equipped with the backlight module of the second embodiment of the present disclosure.

It is to be understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A backlight module, comprising:
a light guide plate, comprising a light incident surface; and
a light source, comprising a plurality of light emitting diodes (LEDs) and a light concentrating and scattering structure, the light concentrating and scattering structure comprising a plurality of hexagonal prisms functioning as lenses;
wherein the light concentrating and scattering structure is disposed between the LEDs and the light incident surface, and is spaced from the light incident surface a predetermined distance such that light emitting from the LEDs is capable of being focused by the light concentrating and scattering structure and then mixing before reaching the light incident surface.

2. The backlight module of claim 1, further comprising a printed circuit board (PCB) and a supporting member engaged with the PCB to form an accommodating room, the LEDs arranged on the PCB in the accommodating room.

3. The backlight module of claim 2, wherein the supporting member comprises a supporting board and two supporting arms extending perpendicularly from two opposite terminal ends of the supporting board.

4. The backlight module of claim 3, wherein the supporting board is made from a transparent material with high transparency.

5. The backlight module of claim 1, wherein the light concentrating and scattering structure is made from a transparent material with high transparency.

6. The backlight module of claim 1, wherein the light guide plate further comprises a light emitting surface perpendicular to the light incident surface.

7. A backlight module, comprising:
a light guide plate, comprising a light incident surface; and
a light source, comprising a plurality of light emitting diodes (LEDs) and a light concentrating and scattering structure, wherein light emitted from each LED defines a limited divergence angle, and the light concentrating and scattering structure comprises a plurality of prisms functioning as convex lens;
wherein the light concentrating and scattering structure is disposed between the LEDs and the light incident surface, and each prism defines a focus, and has a same focal length, the focuses of the prisms are in alignment, the light incident surface is spaced from the prisms a predetermined distance not less than the focal length of the prisms, and light emitted from the LEDs is capable of being expanded by the light concentrating and scattering structure and then mixing before reaching the light incident surface, the limited divergence angle of the light transmitting through the light incident surface is enlarged to be greater than a primary divergence angle of the light just emitted from the LED.

8. The backlight module of claim 7, wherein each prism has a cylinder profile, and the prisms are arranged closely one by one.

9. The backlight module of claim 8, further comprising a printed circuit board (PCB) and a supporting member engaged with the PCB to form an accommodating room, the LEDs arranged on the PCB in the accommodating room.

10. The backlight module of claim 9, wherein the supporting member comprises a supporting board and two supporting arms extending perpendicularly from two opposite terminal ends of the supporting board, and the two supporting arms are engaged with the PCB.

11. The backlight module of claim 10, wherein the supporting board is made from a transparent material with high transparency.

12. The backlight module of claim 11, wherein the light concentrating and scattering structure is disposed on an outer surface of the supporting board.

13. The backlight module of claim 7, wherein each prism has a hexagonal profile, and the prisms are arranged closely one by one.

14. A liquid crystal display (LCD), comprising:
a liquid crystal panel; and
a backlight module configured for providing light for the liquid crystal panel, and comprising:
a light guide plate, comprising a light incident surface; and
a light source, comprising a plurality of light emitting diodes (LEDs) and a light concentrating and scattering structure, wherein light emitting from each LED defines a limited divergence angle, and the light concentrating and scattering structure comprises a plurality of prisms functioning as convex lens;
wherein the light concentrating and scattering structure is disposed between the LEDs and the light incident surface, and each prism defines a focus, and the plurality of prisms has a same focal length, the light incident surface is spaced from the prisms a predetermined distance not less than the focal length of the prisms, and light emitted from each LED is capable of being expanded by the light concentrating and scattering structure and then mixing with adjacent light emitted from an adjacent LED before reaching the light incident surface.

15. The liquid crystal display of claim 14, wherein each prism has a cylinder profile, and the prisms are arranged closely one by one.

16. The liquid crystal display of claim 15, further comprising a printed circuit board (PCB) and a supporting member engaged with the PCB to form an accommodating room, the LEDs arranged on the PCB in the accommodating room.

17. The liquid crystal display of claim 16, wherein the supporting member comprises a supporting board and two supporting arms extending perpendicularly from two opposite terminal ends of the supporting board, and the two supporting arms are engaged with the PCB.

18. The liquid crystal display of claim 17, wherein the supporting board is made from a transparent material with high transparency.

19. The liquid crystal display of claim 18, wherein the light concentrating and scattering structure is disposed on an outer surface of the supporting board.

20. The backlight module of claim 14, wherein each prism has a hexagonal profile, and the prisms are arranged closely one by one.

* * * * *